US012201153B2

(12) United States Patent
Thorsen

(10) Patent No.: US 12,201,153 B2
(45) Date of Patent: Jan. 21, 2025

(54) AEROSOL PROVISION DEVICE

(71) Applicant: Nicoventures Tradeing Limited, London (GB)

(72) Inventor: Mitchel Thorsen, Madison, WI (US)

(73) Assignee: NICOVENTURES TRADING LIMITED, London (GB)

( * ) Notice: Subject to any disclaimer, the term of this patent is extended or adjusted under 35 U.S.C. 154(b) by 506 days.

(21) Appl. No.: 17/593,152

(22) PCT Filed: Mar. 9, 2020

(86) PCT No.: PCT/EP2020/056242
§ 371 (c)(1),
(2) Date: Sep. 10, 2021

(87) PCT Pub. No.: WO2020/182750
PCT Pub. Date: Sep. 17, 2020

(65) Prior Publication Data
US 2022/0183374 A1 Jun. 16, 2022

Related U.S. Application Data

(60) Provisional application No. 62/816,257, filed on Mar. 11, 2019, provisional application No. 62/816,254, filed on Mar. 11, 2019.

(51) Int. Cl.
*A24F 40/465* (2020.01)
*H05B 6/10* (2006.01)

(52) U.S. Cl.
CPC ........... *A24F 40/465* (2020.01); *H05B 6/108* (2013.01)

(58) Field of Classification Search
CPC ....... A24F 40/465; H05B 6/108; H05B 6/105; H05B 6/02; H05B 6/10; H05B 6/101; H05B 2206/022
See application file for complete search history.

(56) References Cited

U.S. PATENT DOCUMENTS 5,649,554 A * 7/1997 Sprinkel ............... A24F 40/465 131/194
9,820,512 B2 * 11/2017 Mironov ................. A24F 40/42
(Continued)

FOREIGN PATENT DOCUMENTS

CN 102803465 A 11/2012
CN 203762288 U 8/2014
(Continued)

OTHER PUBLICATIONS

"International Preliminary Report on Patentability received for PCT Patent Application No. PCT/EP2020/056231, mailed on Sep. 23, 2021", 10 pages.
(Continued)

*Primary Examiner* — Harshad C Patel
(74) *Attorney, Agent, or Firm* — Husch Blackwell

(57) ABSTRACT

An aerosol provision devices are described. One such device comprises a receptacle configured to receive aerosol generating material, wherein the receptacle comprises a susceptor which is heatable by penetration with a varying magnetic field. The device further comprises an insulating member extending around the susceptor, wherein the insulating member is positioned away from the receptacle to provide an air gap around the susceptor. The device further comprises an inductor coil extending around the insulating member such that the insulating member is positioned between the inductor coil and the susceptor, wherein the inductor coil is configured to generate the varying magnetic field.
Another such aerosol provision device comprises: a susceptor configured to receive aerosol generating material, wherein the susceptor is heatable by penetration with a varying magnetic field; an insulating member extending around the susceptor, wherein the insulating member is positioned away from the susceptor; an inductor coil extend-
(Continued)

ing around the insulating member such that the insulating member is positioned between the inductor coil and the susceptor, wherein the inductor coil is configured to generate the varying magnetic field; and an outer cover forming at least a portion of an outer surface of the aerosol provision device, wherein an inner surface of the outer cover is positioned away from an outer surface of the susceptor by a distance of between about 4 mm and about 10 mm.

20 Claims, 7 Drawing Sheets

(56) References Cited

U.S. PATENT DOCUMENTS

| | | | | |
|---|---|---|---|---|
| 10,028,535 | B2 * | 7/2018 | Mironov | H05B 1/0244 |
| 10,136,672 | B2 * | 11/2018 | Minskoff | A61M 11/042 |
| 10,159,283 | B2 * | 12/2018 | Mironov | A24F 40/465 |
| 11,924,930 | B2 * | 3/2024 | Wilke | A24F 40/465 |
| 2015/0070233 | A1 | 3/2015 | Nakamura et al. | |
| 2015/0223292 | A1 * | 8/2015 | Duffield | A61M 15/003 219/634 |
| 2016/0120221 | A1 * | 5/2016 | Mironov | A24F 40/42 392/395 |
| 2017/0027233 | A1 | 2/2017 | Mironov | |
| 2017/0055574 | A1 * | 3/2017 | Kaufman | A24B 15/12 |
| 2017/0055575 | A1 * | 3/2017 | Wilke | H05B 6/105 |
| 2017/0055580 | A1 * | 3/2017 | Blandino | H05B 6/36 |
| 2017/0055583 | A1 | 3/2017 | Blandino et al. | |
| 2017/0079330 | A1 * | 3/2017 | Mironov | H05B 6/38 |
| 2017/0105452 | A1 | 4/2017 | Mironov et al. | |
| 2017/0119046 | A1 * | 5/2017 | Kaufman | H05B 6/105 |
| 2017/0119048 | A1 * | 5/2017 | Kaufman | H05B 6/105 |
| 2017/0202266 | A1 | 7/2017 | Sur | |
| 2018/0070639 | A1 | 3/2018 | Chen et al. | |
| 2018/0192700 | A1 * | 7/2018 | Fraser | A24F 40/42 |
| 2018/0192701 | A1 | 7/2018 | Stoner | |
| 2018/0242636 | A1 * | 8/2018 | Blandino | H05B 1/0291 |
| 2018/0317554 | A1 * | 11/2018 | Kaufman | H05B 6/105 |
| 2019/0000149 | A1 | 1/2019 | Phillips et al. | |

FOREIGN PATENT DOCUMENTS

| | | | |
|---|---|---|---|
| CN | 105307526 | A | 2/2016 |
| CN | 206227716 | U | 6/2017 |
| CN | 206443211 | U | 8/2017 |
| CN | 107920602 | A | 4/2018 |
| CN | 108353520 | A | 7/2018 |
| CN | 208228310 | U | 12/2018 |
| CN | 208228311 | U | 12/2018 |
| CN | 109330030 | A | 2/2019 |
| EP | 2434836 | A2 | 3/2012 |
| EP | 3243395 | A2 | 11/2017 |
| EP | 3367828 | A1 | 9/2018 |
| JP | S63308080 | A | 12/1988 |
| JP | 2005024038 | A | 1/2005 |
| JP | 3771258 | B2 | 4/2006 |
| JP | 2015504670 | A | 2/2015 |
| JP | 2016528874 | A | 9/2016 |
| JP | 2018509627 | A | 4/2018 |
| JP | 2018528765 | A | 10/2018 |
| JP | 2018529322 | A | 10/2018 |
| JP | 2018529324 | A | 10/2018 |
| JP | 2018535660 | A | 12/2018 |
| JP | 2019501630 | A | 1/2019 |
| JP | 2019508632 | A | 3/2019 |
| KR | 20150143885 | A | 12/2015 |
| KR | 20180034640 | A | 4/2018 |
| KR | 10-2020-0099481 | A | 8/2020 |
| RU | 2016150117 | A | 6/2018 |
| RU | 2677086 | C2 | 1/2019 |
| UA | 115323 | C2 | 10/2017 |
| WO | 9527411 | A1 | 10/1995 |
| WO | 2015131058 | A1 | 9/2015 |
| WO | 2015175568 | A1 | 11/2015 |
| WO | 2015177253 | A1 | 11/2015 |
| WO | 2016149666 | A1 | 9/2016 |
| WO | 2017036950 | A2 | 3/2017 |
| WO | 2017068099 | A1 | 4/2017 |
| WO | 2017187389 | A1 | 11/2017 |
| WO | 2017194769 | A1 | 11/2017 |
| WO | 2018041450 | A1 | 3/2018 |
| WO | 2018073376 | A1 | 4/2018 |
| WO | 2018178095 | A1 | 10/2018 |
| WO | 2018178113 | A2 | 10/2018 |
| WO | 2018186156 | A1 | 10/2018 |
| WO | 2019030168 | A1 | 2/2019 |
| WO | 2019030364 | A1 | 2/2019 |

OTHER PUBLICATIONS

"International Preliminary Report on Patentability received for PCT Patent Application No. PCT/EP2020/056242, mailed on Sep. 23, 2021", 8 pages.

"International Preliminary Report on Patentability received for PCT Patent Application No. PCT/EP2020/056246, mailed on Sep. 23, 2021", 8 pages.

"International Search Report and Written Opinion received for PCT Patent Application No. PCT/EP2020/056231, mailed on Jul. 15, 2020", 11 pages.

"International Search Report and Written Opinion received for PCT Patent Application No. PCT/EP2020/056242, mailed on Jun. 22, 2020", 11 pages.

"International Search Report and Written Opinion received for PCT Patent Application No. PCT/EP2020/056246, mailed on Jun. 24, 2020", 10 pages.

"Office Action received for Australian Patent Application No. 2020235037, mailed on May 26, 2022", 3 pages.

"Office Action received for Australian Patent Application No. 2020235790, mailed on Aug. 25, 2022", 4 pages.

"Office Action received for Chinese Patent Application No. 202080035083.1, mailed on Jun. 19, 2023", 8 pages (English Translation Only).

"Office Action received for Russian Patent Application No. 2021126494, mailed on May 24, 2022", 9 pages.

"Office Action received for Russian Patent Application No. 2021126540, mailed on May 20, 2022", 8 pages (Official Copy Only).

"Office Action received for Russian Patent Application No. 2021126648, mailed on May 31, 2022", 9 pages.

"Reasons for Refusal received for Japanese Patent Application No. 2021-554584, mailed on Jan. 17, 2023", 18 pages (9 pages of English Translation and 9 pages of Official Copy).

"Reasons for Refusal received for Japanese Patent Application No. 2023-111257, mailed on Jul. 2, 2024", 7 pages (3 pages of English Translation and 4 pages of Official Copy).

KR Office Action in Korean Application No. 10-2021-7028566 dated Oct. 26, 2024, 7 pages.

* cited by examiner

AEROSOL PROVISION DEVICE

PRIORITY CLAIM

The present application is a National Phase entry of PCT Application No. PCT/EP2020/056242, filed Mar. 9, 2020, which claims priority from U.S. Provisional Application No. 62/816,254, filed Mar. 11, 2019, and which claims priority from U.S. Provisional Application No. 62/816,257, filed Mar. 11, 2019, each of which is hereby fully incorporated herein by reference.

TECHNICAL FIELD

The present invention relates to an aerosol provision device and an aerosol provision system comprising an aerosol provision device and an article comprising aerosol generating material.

BACKGROUND

Smoking articles such as cigarettes, cigars and the like burn tobacco during use to create tobacco smoke. Attempts have been made to provide alternatives to these articles that burn tobacco by creating products that release compounds without burning. Examples of such products are heating devices which release compounds by heating, but not burning, the material. The material may be for example tobacco or other non-tobacco products, which may or may not contain nicotine.

SUMMARY

According to a first aspect of the present disclosure, there is provided an aerosol provision device. The device includes a receptacle configured to receive aerosol generating material, wherein the receptacle comprises a susceptor which is heatable by penetration with a varying magnetic field; an insulating member extending around the susceptor, wherein the insulating member is positioned away from the receptacle to provide an air gap around the susceptor; and an inductor coil extending around the insulating member such that the insulating member is positioned between the inductor coil and the susceptor, wherein the inductor coil is configured to generate the varying magnetic field.

According to a second aspect of the present disclosure, there is provided an aerosol provision system. The system includes an aerosol provision device according to the first aspect; and an article comprising aerosol generating material, wherein the article is dimensioned to be at least partially received within the receptacle.

According to a third aspect of the present disclosure there is provided an aerosol provision device. The device includes a susceptor configured to receive aerosol generating material, wherein the susceptor is heatable by penetration with a varying magnetic field; an insulating member extending around the susceptor, wherein the insulating member is positioned away from the susceptor; an inductor coil extending around the insulating member such that the insulating member is positioned between the inductor coil and the susceptor, wherein the inductor coil is configured to generate the varying magnetic field; and an outer cover forming at least a portion of an outer surface of the aerosol provision device, wherein an inner surface of the outer cover is positioned away from an outer surface of the susceptor by a distance of between about 4 mm and about 10 mm.

According to a fourth aspect of the present disclosure there is provided an aerosol provision device. The device includes a receptacle configured to receive aerosol generating material, wherein the receptacle comprises a susceptor which is heatable by penetration with a varying magnetic field; an insulating member extending around the susceptor, wherein the insulating member is positioned away from the receptacle; an inductor coil extending around the insulating member such that the insulating member is positioned between the inductor coil and the susceptor, wherein the inductor coil is configured to generate the varying magnetic field; and an outer cover forming an outer surface of the aerosol provision device, wherein an inner surface of the outer cover is positioned away from an outer surface of the inductor coil by a distance of between about 0.2 mm and about 1 mm.

According to a fifth aspect of the present disclosure, there is provided an aerosol provision system. The system includes an aerosol provision device according to the third or fourth aspect; and an article comprising aerosol generating material, wherein the article is dimensioned to be at least partially received, in use, within a susceptor of the aerosol provision device.

According to a sixth aspect of the present disclosure there is provided an aerosol provision system. The system includes an aerosol provision device according to the third or fourth aspect; and an article comprising aerosol generating material, wherein the article is dimensioned to be in contact with a susceptor of the aerosol provision device in use.

Further features and advantages of the invention will become apparent from the following description of preferred embodiments of the invention, given by way of example only, which is made with reference to the accompanying drawings.

DETAILED DESCRIPTION OF THE DRAWINGS

Figure 1:
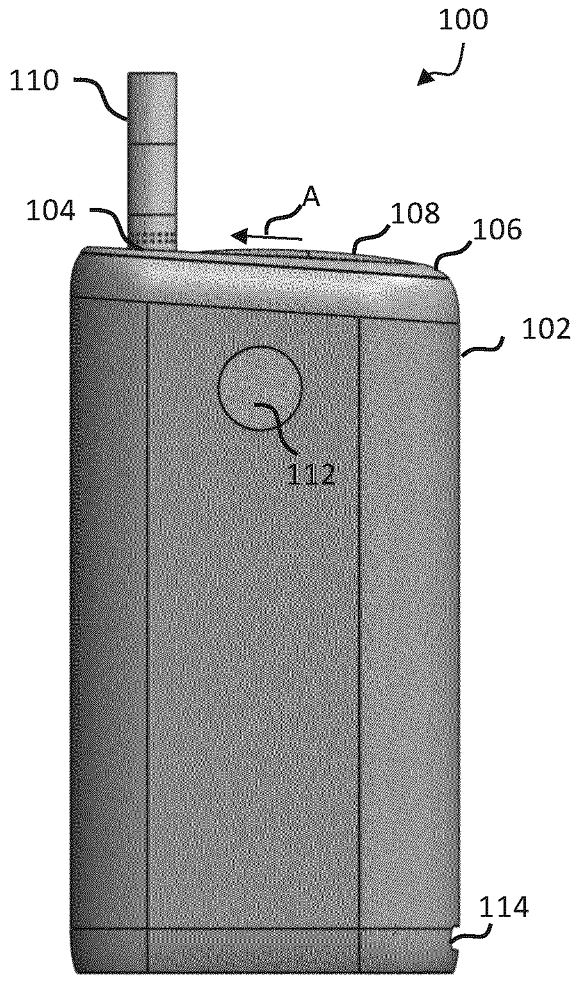
FIG. 1 shows a front view of an example of an aerosol provision device.

As used herein, the term "aerosol generating material" includes materials that provide volatilized components upon heating, typically in the form of an aerosol. Aerosol generating material includes any tobacco-containing material and may, for example, include one or more of tobacco, tobacco derivatives, expanded tobacco, reconstituted tobacco or tobacco substitutes. Aerosol generating material also may include other, non-tobacco, products, which, depending on the product, may or may not contain nicotine. Aerosol generating material may for example be in the form of a solid, a liquid, a gel, a wax or the like. Aerosol generating material may for example also be a combination or a blend of materials. Aerosol generating material may also be known as "smokable material".

Apparatuses are known that heat aerosol generating material to volatilize at least one component of the aerosol generating material, typically to form an aerosol which can be inhaled, without burning or combusting the aerosol generating material. Such apparatuses are sometimes described as an "aerosol generating device," an "aerosol provision device," a "heat-not-burn device," a "tobacco heating product device," or a "tobacco heating device" or similar. Similarly, there are also so-called e-cigarette devices, which typically vaporize an aerosol generating material in the form of a liquid, which may or may not contain nicotine. The aerosol generating material may be in the form of or be provided as part of a rod, cartridge or cassette or the like which can be inserted into the apparatus. A heater for heating and volatilizing the aerosol generating material may be provided as a "permanent" part of the apparatus.

An aerosol provision device can receive an article comprising aerosol generating material for heating. An "article" in this context is a component that includes or contains in use the aerosol generating material, which is heated to volatilize the aerosol generating material, and optionally other components in use. A user may insert the article into the aerosol provision device before it is heated to produce an aerosol, which the user subsequently inhales. The article may be, for example, of a predetermined or specific size that is configured to be placed within a heating chamber of the device which is sized to receive the article.

A first aspect of the present disclosure defines the specific arrangement of a susceptor, an insulating member and one or more inductor coils. As will be discussed in more detail herein, the susceptor is an electrically conducting object, which is heatable by penetration with a varying magnetic field. The inductor coil generates the varying magnetic field which causes the susceptor to be heated. An article comprising aerosol generating material can be received within the receptacle. Once heated, the susceptor transfers heat to the aerosol generating material, which releases the aerosol. In one example, the susceptor defines the receptacle and the susceptor receives the aerosol generating material.

In the present arrangement, the susceptor is surrounded by an insulating member which can be arranged coaxially with the susceptor, for example. The insulating member is positioned away from the outer surface of the receptacle or susceptor to provide an air gap. Extending around the insulating member is an inductor coil. This means that the insulating member is located between the inductor coil and the susceptor, and the air gap is located between the insulating member and the susceptor. In certain arrangements the inductor coil may be in contact with the insulating member. However, in other examples a further air gap may be provided between the insulating member and the inductor coil.

The above described arrangement provides a device with improved insulation. The specific order of the air gap and the insulating member provides improved insulation from the heated susceptor. The air gap helps insulate the insulating member from the heat, together the air gap and insulating member help insulate other components of the device from the heat. For example, the air gap and insulating member reduce any heating of the inductor coil, electronics, and/or battery by the susceptor.

As mentioned above, the insulating member is positioned away from the receptacle/susceptor to provide an air gap. For example, the inner surface of the insulating member is spaced apart from the outer surface of the susceptor. This means that an air gap surrounds the outer surface of the susceptor, and the susceptor is not in contact with the insulating member in this region. Any contact could provide a thermal bridge along which heat could flow. In some examples the ends of the susceptor may be connected directly or indirectly to the insulating member. This contact may be sufficiently far away from the main heating region of the susceptor so as not to unduly reduce the insulative properties provided by the air gap and insulating member. Alternatively or additionally, this contact may also be over a relatively small area such that any heat transfer to the insulating member by conduction from the susceptor is small.

In a particular arrangement the susceptor is elongate and defines an axis, such as a longitudinal axis. The insulating member extends around the susceptor and the axis in an azimuthal direction. The insulating member is therefore positioned radially outward from the susceptor, for example the insulating member may be coaxial with the susceptor. This radial direction is defined as being perpendicular to the axis of the susceptor. Similarly, the inductor coil extends around the insulating member and is positioned radially outwards from both the susceptor and the insulating member, the inductor coil may be coaxial with the insulating member and the susceptor.

The susceptor may be hollow and/or substantially tubular to allow the aerosol generating material to be received within the susceptor, such that the susceptor surrounds the aerosol generating material. The insulating member may be hollow and/or substantially tubular so that the susceptor can be positioned within the insulating member.

The inductor coil may be substantially helical. For example, the inductor coil may be formed from wire, such as Litz wire, which is wound helically around the insulating member.

The inductor coil may be positioned away from an outer surface of the susceptor by a distance of between about 3 mm and about 4 mm. Accordingly, the inner surface of the inductor coil and the outer surface of the susceptor may be spaced apart by this distance. The distance may be a radial distance. It has been found that distances within this range represent a good balance between the susceptor being radially close to the inductor coil to allow efficient heating of the susceptor and being radially distant for improved insulation of the induction coil and insulating member.

In another example, the inductor coil may be positioned away from the outer surface of the susceptor by a distance of greater than about 2.5 mm.

In another example, the inductor coil may be positioned away from an outer surface of the susceptor by a distance of between about 3 mm and about 3.5 mm. In a further example, the inductor coil may be positioned away from an outer surface of the susceptor by a distance of between about 3 mm and about 3.25 mm, for example preferably by about 3.25 mm. In another example, the inductor coil may be positioned away from an outer surface of the susceptor by a distance greater than about 3.2 mm. In a further example the inductor coil may be positioned away from an outer surface of the susceptor by a distance of less than about 3.5 mm, or by less than about 3.3 mm. It has been found that these distances provide a balance between the susceptor being radially close to the inductor coil to allow efficient heating and being radially distant for improved insulation of the induction coil and insulating member.

In an alternative example, the inductor coil may be positioned away from an outer surface of the susceptor by a distance of between about 2 mm and about 10 mm.

Reference to an "outer surface" of an entity means the surface positioned furthest away from the axis of the susceptor, in a direction perpendicular to the axis. Similarly, reference to an "inner surface" of an entity means the surface positioned closest to the axis of the susceptor, in a direction perpendicular to the axis.

The insulating member may have a thickness of between about 0.25 mm and about 1 mm. For example, the insulating member may have a thickness of less than about 0.7 mm, or less than about 0.6 mm, or may have a thickness of between about 0.25 mm and about 0.75 mm, or preferably has a thickness of between about 0.4 mm and about 0.6 mm, such as about 0.5 mm. It has been found that these thicknesses represent a good balance between reducing heating of the insulating member and inductor coil (by making the insulating member thinner to increase the air gap size), and increasing the robustness of the insulating member (by making it thicker).

The susceptor may have a thickness between about 0.025 mm and about 0.5 mm, or between about 0.025 mm and about 0.25 mm, or between about 0.03 mm and about 0.1 mm, or between about 0.04 mm and about 0.06 mm. For example, the susceptor may have a thickness of greater than about 0.025 mm, or greater than about 0.03 mm, or greater than about 0.04 mm, or less than about 0.5 mm, or less than about 0.25 mm, or less than about 0.1 mm, or less than about 0.06 mm. It has been found that these thicknesses provide a good balance between fast heating of the susceptor (as it is made thinner), and ensuring that the susceptor is robust (as it is made thicker).

In an example, the susceptor has a thickness of about 0.05 mm. This provides a balance between fast and effective heating, and robustness. Such a susceptor may be easier to manufacture and assemble as part of an aerosol provision device than other susceptors with thinner dimensions.

Reference to the "thickness" of an entity means the average distance between the inner surface of the entity and the outer surface of the entity. Thickness may be measured in a direction perpendicular to the axis of the susceptor.

In a particular arrangement of the aerosol provision device, the inductor coil is positioned away from an outer surface of the susceptor by a distance of between about 3 mm and about 4 mm, the insulating member has a thickness of between about 0.25 mm and about 1 mm, and the susceptor has a thickness of between about 0.025 mm and about 0.5 mm. Such an aerosol provision device allows quick heating of the susceptor and effective insulative properties.

In another particular arrangement, the inductor coil may be positioned away from an outer surface of the susceptor by a distance of between about 3 mm and about 3.5 mm, the insulating member has a thickness of between about 0.25 mm and about 0.75 mm, and the susceptor has a thickness of between about 0.04 mm and about 0.06 mm. Such an aerosol provision device allows improved heating of the susceptor and improved insulative properties.

In a further particular arrangement, the inductor coil is positioned away from an outer surface of the susceptor by a distance of about 3.25 mm, the insulating member has a thickness of about 0.5 mm, and the susceptor has a thickness of about 0.05 mm. Such an aerosol provision device allows efficient heating of the susceptor and good insulative properties.

The inductor coil, the susceptor and the insulating member may be coaxial. This arrangement ensures that the susceptor is heated effectively, and ensures that the air gap and insulating member provide effective insulation.

The inner surface of the inductor coil may be in contact with an outer surface of the insulating member. Thus, the insulating member can support the inductor coil without the need for other components. In other examples however there may be a further air gap present between the inner surface of the inductor coil and the outer surface of the insulating member. The distance between the inner surface of the inductor coil and the outer surface of the insulating member may be less than about 0.1 mm, for example it may be about 0.05 mm.

As mentioned, in the second aspect of the present disclosure there is provided an aerosol provision system comprising an aerosol provision device as described above and an article comprising aerosol generating material. The article may be dimensioned to be received within a susceptor of the aerosol provision device such that an outer surface of the article is in contact with an inner surface of the susceptor. Accordingly, the article may be dimensioned so that it abuts the inner surface of the susceptor.

A third aspect of the present disclosure defines the specific arrangement of a susceptor, an insulating member, one or more inductor coils and an outer cover. In the third aspect, the device comprises an outer cover which forms at least a portion of an outer surface of the device. An inner surface of the outer cover is positioned away from an outer surface of the susceptor by a distance of between about 4 mm and about 10 mm.

This distance is the distance between the outer surface of the susceptor and the inner surface of the outer cover at its closest point. The distance may therefore be the minimum distance between the outer surface of the susceptor and the inner surface of the outer cover. In one example, the distance may be measured between the susceptor and a side surface of the device.

It has been found that when the outer is cover is positioned away from the susceptor by this distance, the outer cover is insulated enough from the heated susceptor to avoid discomfort or injury to a user, while reducing the size and weight of the device. Thus, distances within this range represents a good balance between insulation properties and device dimensions.

The outer cover may also be known as an outer casing. The outer casing may fully surround the device, or may extend partially around the device.

In one example, the inner surface of the outer cover is positioned away from the outer surface of the susceptor by a distance of between about 4 mm and about 6 mm. In another example, the inner surface of the outer cover is positioned away from the outer surface of the susceptor by a distance of between about 5 mm and about 6 mm. Preferably, the inner surface of the outer cover is positioned away from the outer surface of the susceptor by a distance of between about 5 mm and about 5.5 mm, such as between about 5.3 mm and about 5.4 mm. A spacing within this range of distances provides better insulation while also ensuring that the device remains small and lightweight. In a particular example, the spacing is 5.3 mm.

In some examples, in use, the inductor coil is configured to heat the susceptor to a temperature of between about 200° C. and about 300° C., such as between about 240° C. and about 300° C., or between about 250° C. and about 280° C. When the outer cover is spaced apart from the susceptor by at least this distance, the temperature of the outer cover remains at a safe level, such as less than about 60° C., less than about 50° C., or less than about 48° C., or less than about 43° C.

In an alternative arrangement, the inner surface of the outer cover may be positioned away from an outer surface of the susceptor by a distance of between about 2 mm and about 10 mm.

In some examples, an air gap is formed between the inductor coil and the outer cover. The air gap provides insulation.

The insulating member may have a thickness of between about 0.25 mm and about 1 mm, as described above. The insulating member (and any air gap between the susceptor and insulating member) helps insulate the outer cover from the heated susceptor.

The insulating member may be constructed from any insulating material, such as plastic for example. In a particular example, the insulating member is constructed from polyether ether ketone (PEEK). PEEK has good insulating properties and is well suited for use in an aerosol provision device.

In another example, the insulating member may comprise mica or mica-glass ceramic. These materials have good insulation properties.

The insulating member may have a thermal conductivity of less than about 0.5 W/mK, or less than about 0.4 W/mK. For example, the thermal conductivity may be about 0.3 W/mK. PEEK has a thermal conductivity of about 0.32 W/mK.

The insulating member may have a melting point of greater than about 320° C., such as greater than about 300° C., or greater than about 340° C. PEEK has a melting point of 343° C.

Insulating members with such melting points ensure that the insulating member remains rigid/solid when the susceptor is heated.

The inner surface of the outer cover may be positioned away from the outer surface of the insulating member by a distance of between about 2 mm and about 3 mm. It has been found that a separation distance of this size provides enough insulation to ensure that the outer cover does not get too hot. Air may be located between the outer surface of the insulating member and the outer cover.

More particularly, the inner surface of the outer cover may be positioned away from the outer surface of the insulating member by a distance of between about 2 mm and about 2.5 mm, such as about 2.3 mm. Such dimensions provide a good balance between providing insulation while reducing the dimensions of the device.

The inner surface of the outer cover may be positioned away from an outer surface of the inductor coil by a distance of between about 0.2 mm and about 1 mm. In some examples the inductor coil itself may heat up as it is used to induce a magnetic field, for example from resistive heating due to the current passing through it to induce the magnetic field. Providing a spacing between the inductor coil and outer cover ensures that the heated inductor coil is insulated from the outer cover. In some examples ferrite shielding is located between the inner surface of the outer cover and the inductor coil. The ferrite shielding additionally helps insulate the inner surface of the outer cover. It has been found that when the ferrite shielding is in contact with, and at least partially surrounds the one or more inductor coils, the surface temperature of the outer cover can be reduced by about 3° C.

In one example, the inductor coil comprises litz wire, and the litz wire has a circular shaped cross section. In such an example, the inner surface of the outer cover is positioned away from the outer surface of the inductor coil by a distance of between about 0.2 mm and about 0.5 mm, or between about 0.2 mm and about 0.3 mm such as about 0.25 mm.

In one example, the inductor coil comprises litz wire, and the litz wire has a rectangular shaped cross section. In such an example, the inner surface of the outer cover is positioned away from an outer surface of the inductor coil by a distance of between about 0.5 mm and about 1 mm, or between about 0.8 mm and about 1 mm, such as about 0.9 mm. A litz wire with a circular cross section can be arranged closer to the outer cover than a litz wire with a rectangular cross section because the circular cross section wire has a smaller surface area exposed towards the outer cover.

As mentioned above, the inner surface of the inductor coil may be positioned away from the outer surface of the susceptor by a distance of between about 3 mm and about 4 mm.

The outer cover may comprise aluminum. Aluminum has good heat dissipation properties.

The outer cover may have a thermal conductivity of between about 200 W/mK and about 220 W/mK. For example, aluminum has a thermal conductivity of around 209 W/mK. Thus, the outer cover may have a relatively high thermal conductivity to ensure that it heat disperses throughout the outer cover, which in turn is lost to the atmosphere, thereby cooling the device.

The outer cover may have a thickness of between about 0.75 mm and about 2 mm. The outer cover can therefore also act as an insulating barrier. These thicknesses provide a good balance between providing good insulation and reducing the size and weight of the device. Preferably the outer cover has a thickness of between about 1 mm and about 1.75 mm, such as between about 1.25 mm and 1.75 mm. Still more preferably the outer cover has a thickness of between about 1.4 mm and about 1.6 mm, such as about 1.5 mm. This particular thickness has been found to reduce the external surface temperature of the outer cover.

In an alternative example, the thickness is between about 0.75 mm and about 1.25 mm, such as about 1 mm.

In any of the above aspects, the aerosol provision device may additionally or alternatively comprise at least one insulation layer positioned within the device. The insulation layer additionally insulates the outer cover from the susceptor. The device comprises at least a susceptor and at least one inductor coil.

An insulation layer may be located in any or all of the following locations: (i) between the susceptor and insulating member, (ii) between the insulating member and the inductor coils, (iii) between the inductor coils and outer cover. In (ii), the insulating member may have a smaller outer diameter to accommodate the insulation layer. Additionally, or alternatively, the inductor coils may have a larger inner diameter to accommodate the insulation layer. The insulation layer may comprise multiple layers of materials.

The insulation layer may be provided by any of the following materials (i) air (which has a thermal conductivity of about 0.02 W/mK), (ii) AEROZERO® (which has a thermal conductivity of between about 0.03 W/mK and about 0.04 W/mK), (iii) polyether ether ketone (PEEK) (which may have a thermal conductivity of about 0.25

W/mK in some examples), (iv) ceramic cloth (which has a specific heat of about 1.13 kJ/kgK), (v) thermal putty.

Preferably, the device is a tobacco heating device, also known as a heat-not-burn device.

FIG. 1 shows an example of an aerosol provision device 100 for generating aerosol from an aerosol generating medium/material. In broad outline, the device 100 may be used to heat a replaceable article 110 comprising the aerosol generating medium, to generate an aerosol or other inhalable medium which is inhaled by a user of the device 100.

The device 100 comprises a housing 102 (in the form of an outer cover) which surrounds and houses various components of the device 100. The device 100 has an opening 104 in one end, through which the article 110 may be inserted for heating by a heating assembly. In use, the article 110 may be fully or partially inserted into the heating assembly where it may be heated by one or more components of the heater assembly.

The device 100 of this example comprises a first end member 106 which comprises a lid 108 which is moveable relative to the first end member 106 to close the opening 104 when no article 110 is in place. In FIG. 1, the lid 108 is shown in an open configuration, however the cap 108 may move into a closed configuration. For example, a user may cause the lid 108 to slide in the direction of arrow "A".

The device 100 may also include a user-operable control element 112, such as a button or switch, which operates the device 100 when pressed. For example, a user may turn on the device 100 by operating the switch 112.

The device 100 may also comprise an electrical component, such as a socket/port 114, which can receive a cable to charge a battery of the device 100. For example, the socket 114 may be a charging port, such as a USB charging port. In some examples the socket 114 may be used additionally or alternatively to transfer data between the device 100 and another device, such as a computing device.

Figure 2:
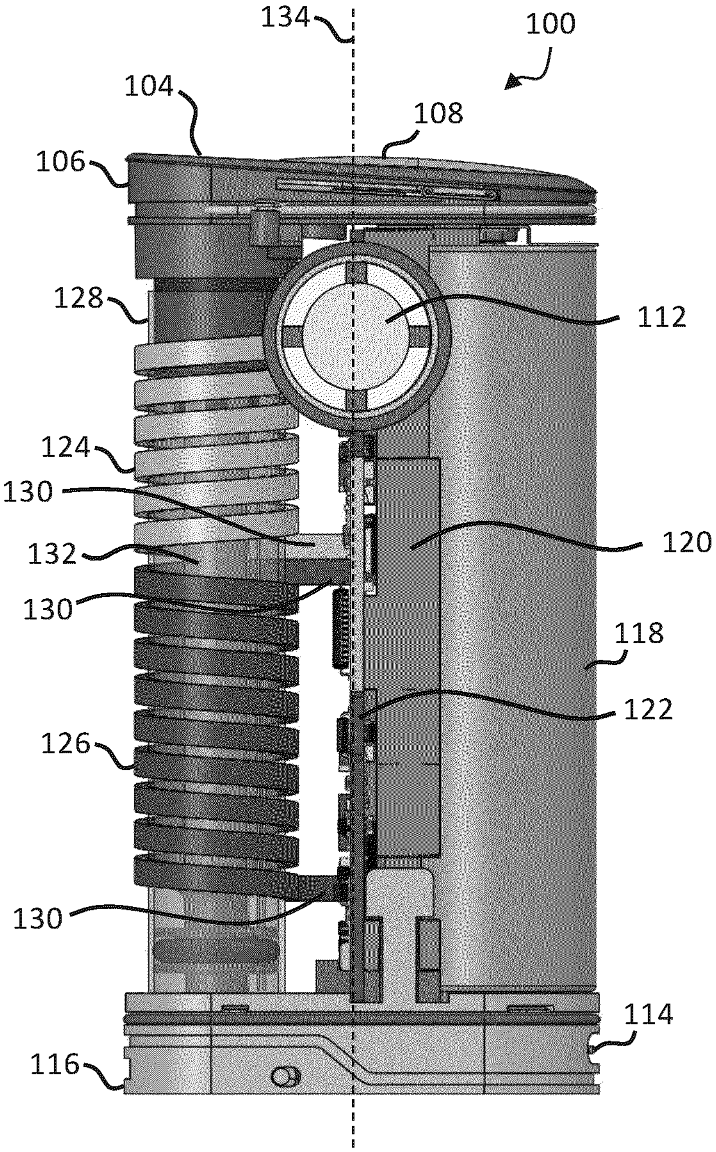
FIG. 2 shows a front view of the aerosol provision device of FIG. 1 with an outer cover removed.

FIG. 2 depicts the device 100 of FIG. 1 with the outer cover 102 removed and without an article 110 present. The device 100 defines a longitudinal axis 134.

As shown in FIG. 2, the first end member 106 is arranged at one end of the device 100 and a second end member 116 is arranged at an opposite end of the device 100. The first and second end members 106, 116 together at least partially define end surfaces of the device 100. For example, the bottom surface of the second end member 116 at least partially defines a bottom surface of the device 100. Edges of the outer cover 102 may also define a portion of the end surfaces. In this example, the lid 108 also defines a portion of a top surface of the device 100.

The end of the device closest to the opening 104 may be known as the proximal end (or mouth end) of the device 100 because, in use, it is closest to the mouth of the user. In use, a user inserts an article 110 into the opening 104, operates the user control 112 to begin heating the aerosol generating material and draws on the aerosol generated in the device. This causes the aerosol to flow through the device 100 along a flow path towards the proximal end of the device 100.

The other end of the device furthest away from the opening 104 may be known as the distal end of the device 100 because, in use, it is the end furthest away from the mouth of the user. As a user draws on the aerosol generated in the device, the aerosol flows away from the distal end of the device 100.

The device 100 further comprises a power source 118. The power source 118 may be, for example, a battery, such as a rechargeable battery or a non-rechargeable battery. Examples of suitable batteries include, for example, a lithium battery (such as a lithium-ion battery), a nickel battery (such as a nickel-cadmium battery), and an alkaline battery. The battery is electrically coupled to the heating assembly to supply electrical power when required and under control of a controller (not shown) to heat the aerosol generating material. In this example, the battery is connected to a central support 120 which holds the battery 118 in place.

The device further comprises at least one electronics module 122. The electronics module 122 may comprise, for example, a printed circuit board (PCB). The PCB 122 may support at least one controller, such as a processor, and memory. The PCB 122 may also comprise one or more electrical tracks to electrically connect together various electronic components of the device 100. For example, the battery terminals may be electrically connected to the PCB 122 so that power can be distributed throughout the device 100. The socket 114 may also be electrically coupled to the battery via the electrical tracks.

In the example device 100, the heating assembly is an inductive heating assembly and comprises various components to heat the aerosol generating material of the article 110 via an inductive heating process. Induction heating is a process of heating an electrically conducting object (such as a susceptor) by electromagnetic induction. An induction heating assembly may comprise an inductive element, for example, one or more inductor coils, and a device for passing a varying electric current, such as an alternating electric current, through the inductive element. The varying electric current in the inductive element produces a varying magnetic field. The varying magnetic field penetrates a susceptor suitably positioned with respect to the inductive element, and generates eddy currents inside the susceptor. The susceptor has electrical resistance to the eddy currents, and hence the flow of the eddy currents against this resistance causes the susceptor to be heated by Joule heating. In cases where the susceptor comprises ferromagnetic material such as iron, nickel or cobalt, heat may also be generated by magnetic hysteresis losses in the susceptor, i.e., by the varying orientation of magnetic dipoles in the magnetic material as a result of their alignment with the varying magnetic field. In inductive heating, as compared to heating by conduction for example, heat is generated inside the susceptor, allowing for rapid heating. Further, there need not be any physical contact between the inductive heater and the susceptor, allowing for enhanced freedom in construction and application.

The induction heating assembly of the example device 100 comprises a susceptor arrangement 132 (herein referred to as "a susceptor"), a first inductor coil 124 and a second inductor coil 126. The first and second inductor coils 124, 126 are made from an electrically conducting material. In this example, the first and second inductor coils 124, 126 are made from Litz wire/cable which is wound in a helical fashion to provide helical inductor coils 124, 126. Litz wire comprises a plurality of individual wires which are individually insulated and are twisted together to form a single wire. Litz wires are designed to reduce the skin effect losses in a conductor. In the example device 100, the first and second inductor coils 124, 126 are made from copper Litz wire which has a rectangular cross section. In other examples the Litz wire can have other shape cross sections, such as circular.

The first inductor coil 124 is configured to generate a first varying magnetic field for heating a first section of the susceptor 132 and the second inductor coil 126 is configured to generate a second varying magnetic field for heating a second section of the susceptor 132. In this example, the first inductor coil 124 is adjacent to the second inductor coil 126 in a direction along the longitudinal axis 134 of the device 100 (that is, the first and second inductor coils 124, 126 to not overlap). The susceptor arrangement 132 may comprise a single susceptor, or two or more separate susceptors. Ends 130 of the first and second inductor coils 124, 126 can be connected to the PCB 122.

It will be appreciated that the first and second inductor coils 124, 126, in some examples, may have at least one characteristic different from each other. For example, the first inductor coil 124 may have at least one characteristic different from the second inductor coil 126. More specifically, in one example, the first inductor coil 124 may have a different value of inductance than the second inductor coil 126. In FIG. 2, the first and second inductor coils 124, 126 are of different lengths such that the first inductor coil 124 is wound over a smaller section of the susceptor 132 than the second inductor coil 126. Thus, the first inductor coil 124 may comprise a different number of turns than the second inductor coil 126 (assuming that the spacing between individual turns is substantially the same). In yet another example, the first inductor coil 124 may be made from a different material to the second inductor coil 126. In some examples, the first and second inductor coils 124, 126 may be substantially identical.

In this example, the first inductor coil 124 and the second inductor coil 126 are wound in opposite directions. This can be useful when the inductor coils are active at different times. For example, initially, the first inductor coil 124 may be operating to heat a first section of the article 110, and at a later time, the second inductor coil 126 may be operating to heat a second section of the article 110. Winding the coils in opposite directions helps reduce the current induced in the inactive coil when used in conjunction with a particular type of control circuit. In FIG. 2, the first inductor coil 124 is a right-hand helix and the second inductor coil 126 is a left-hand helix. However, in another embodiment, the inductor coils 124, 126 may be wound in the same direction, or the first inductor coil 124 may be a left-hand helix and the second inductor coil 126 may be a right-hand helix.

The susceptor 132 of this example is hollow and therefore defines a receptacle within which aerosol generating material is received. For example, the article 110 can be inserted into the susceptor 132. In this example the susceptor 120 is tubular, with a circular cross section.

The device 100 of FIG. 2 further comprises an insulating member 128 which may be generally tubular and at least partially surround the susceptor 132. The insulating member 128 may be constructed from any insulating material, such as plastic for example. In this particular example, the insulating member is constructed from polyether ether ketone (PEEK). The insulating member 128 may help insulate the various components of the device 100 from the heat generated in the susceptor 132.

The insulating member 128 can also fully or partially support the first and second inductor coils 124, 126. For example, as shown in FIG. 2, the first and second inductor coils 124, 126 are positioned around the insulating member 128 and are in contact with a radially outward surface of the insulating member 128. In some examples the insulating member 128 does not abut the first and second inductor coils 124, 126. For example, a small gap may be present between the outer surface of the insulating member 128 and the inner surface of the first and second inductor coils 124, 126.

In a specific example, the susceptor 132, the insulating member 128, and the first and second inductor coils 124, 126 are coaxial around a central longitudinal axis of the susceptor 132.

Figure 3:
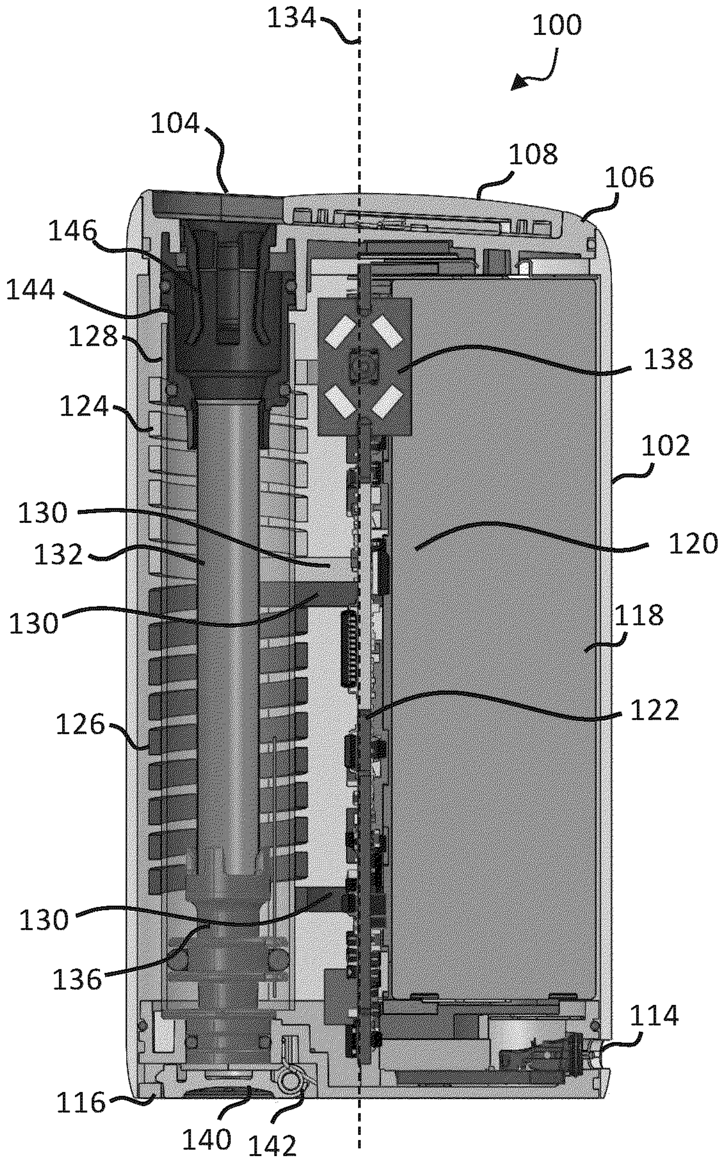
FIG. 3 shows a cross-sectional view of the aerosol provision device of FIG. 1.

FIG. 3 shows a side view of device 100 in partial cross-section. The outer cover 102 is present in this example. The rectangular cross-sectional shape of the first and second inductor coils 124, 126 is more clearly visible.

The device 100 further comprises a support 136 which engages one end of the susceptor 132 to hold the susceptor 132 in place. The support 136 is connected to the second end member 116.

The device may also comprise a second printed circuit board 138 associated within the control element 112.

The device 100 further comprises a second lid/cap 140 and a spring 142, arranged towards the distal end of the device 100. The spring 142 allows the second lid 140 to be opened, to provide access to the susceptor 132. A user may open the second lid 140 to clean the susceptor 132 and/or the support 136.

The device 100 further comprises an expansion chamber 144 which extends away from a proximal end of the susceptor 132 towards the opening 104 of the device. Located at least partially within the expansion chamber 144 is a retention clip 146 to abut and hold the article 110 when received within the device 100. The expansion chamber 144 is connected to the end member 106.

Figure 4:
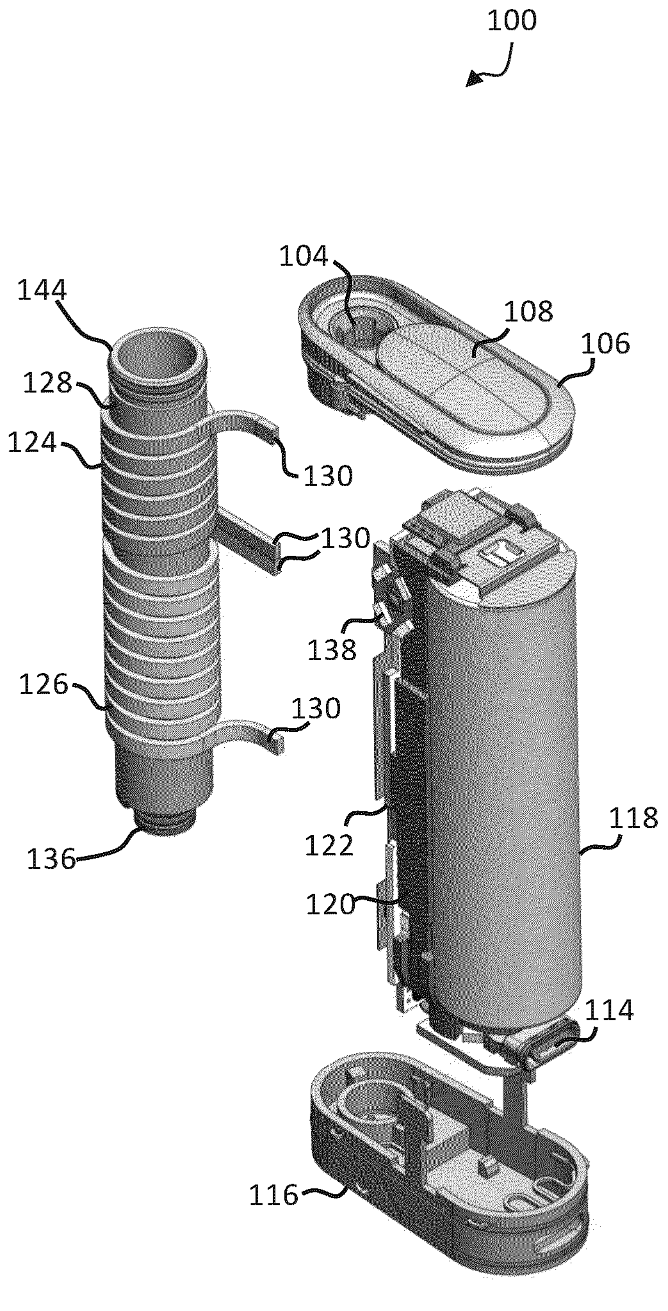
FIG. 4 shows an exploded view of the aerosol provision device of FIG. 2.

FIG. 4 is an exploded view of the device 100 of FIG. 1, with the outer cover 102 omitted.

Figure 5A:
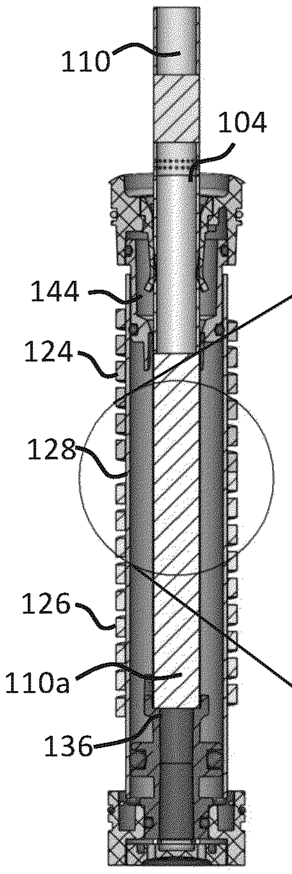
FIG. 5A shows a cross-sectional view of a heating assembly within an aerosol provision device.
Figure 5B:
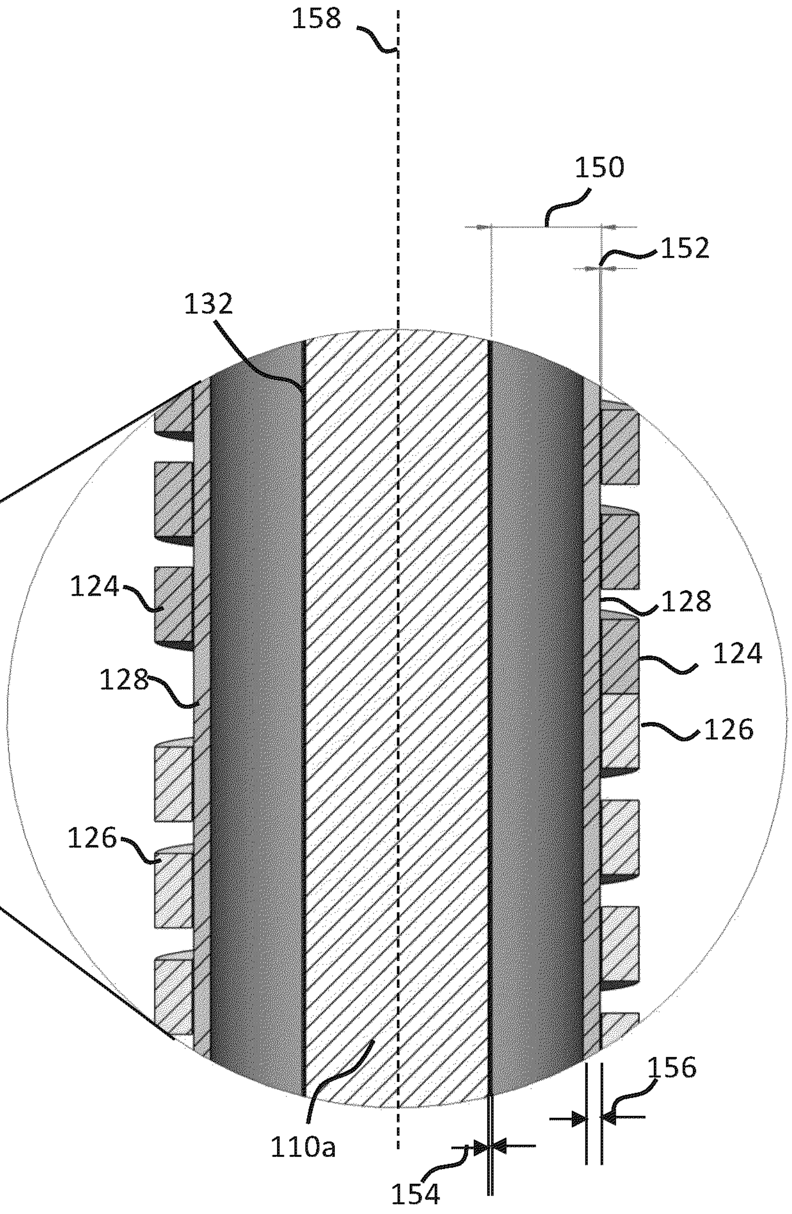
FIG. 5B shows a close-up view of a portion of the heating assembly of FIG. 5A.

FIG. 5A depicts a cross section of a portion of the device 100 of FIG. 1. FIG. 5B depicts a close-up of a region of FIG. 5A. FIGS. 5A and 5B show the article 110 received within a receptacle provided by the susceptor 132, where the article 110 is dimensioned so that the outer surface of the article 110 abuts the inner surface of the susceptor 132. This ensures that the heating is most efficient. The article 110 of this example comprises aerosol generating material 110*a*. The aerosol generating material 110*a* is positioned within the susceptor 132. The article 110 may also comprise other components such as a filter, wrapping materials and/or a cooling structure.

FIG. 5B shows a longitudinal axis 158 of the hollow, tubular susceptor 132. The inner and outer surfaces of the susceptor 132 extend around the axis 158 in an azimuthal direction. Surrounding the susceptor 132 is the hollow, tubular insulating member 128. An inner surface of the insulating member 128 is positioned away from the outer surface of the susceptor 132 to provide an air gap between the insulating member 128 and the susceptor 132. The air gap provides insulation from the heat generated in the susceptor 132. Surrounding the insulating member 128 are the inductor coils 124, 126. It will be appreciated that in some examples just one inductor coil may surround the insulating member 128. The inductor coils 124, 126 are helically wrapped around the insulating member, and extend along the axis 158.

FIG. 5B shows that the outer surface of the susceptor 132 is spaced apart from the inner surface of the inductor coils 124, 126 by a distance 150, measured in a direction perpendicular to the longitudinal axis 158 of the susceptor 132. In a particular example, the distance 150 is about 3.25 mm. The outer surface of the susceptor 132 is the surface that is furthest away from the axis 158. The inner surface of the susceptor 132 is the surface that is closest to the axis 158. The inner surface of the inductor coils 124, 126 is the surface that is closest to the axis 158. The outer surface of the insulating member 128 is the surface that is furthest away from the axis 158.

To achieve the relative spacing between the susceptor 132 and the inductor coils 124, 126, the insulating member 128 can be formed with specific dimensions. The insulating member 128 and susceptor 132 can be held in place by one or more components of the device 100. In the example of FIG. 5A, the insulating member 128 and susceptor 132 is held in place at one end by the support 136, and at the other end by the expansion chamber 144. In other examples different components may hold the insulating member 128 and susceptor 132.

FIG. 5B further shows that the outer surface of the insulating member 128 is spaced apart from the inner surface of the inductor coils 124, 126 by a distance 152, measured in a direction perpendicular to a longitudinal axis 158 of the susceptor 132. In one particular example, the distance 152 is about 0.05 mm. In another example, the distance 152 is substantially 0 mm, such that the inductor coils 124, 126 abut and touch the insulating member 128.

In this example, the susceptor 132 has a thickness 154 of about 0.05 mm. The thickness of the susceptor 132 is the average distance between the inner surface of the susceptor 132 and the outer surface of the susceptor 132, measured in a direction perpendicular to the axis 158.

In an example, the susceptor 132 has a length of between about 40 mm and about 50 mm, or between about 40 mm and about 45 mm. In this particular example, the susceptor 132 has a length of about 44.5 mm and can receive an article 110 comprising aerosol generating material, where the aerosol generating material 110*a* has a length of about 42 mm. The length of the aerosol generating material and susceptor 132 is measured in a direction parallel to the axis 158.

In an example, the insulating member 128 has a thickness 156 of between about 0.25 mm and about 2 mm, or between about 0.25 mm and about 1 mm. In this particular example, the insulating member has a thickness 156 of about 0.5 mm. The thickness 156 of the insulating member 128 is the average distance between the inner surface of the insulating member 128 and the outer surface of the insulating member 128, measured in a direction perpendicular to the axis 158.

Figure 6:
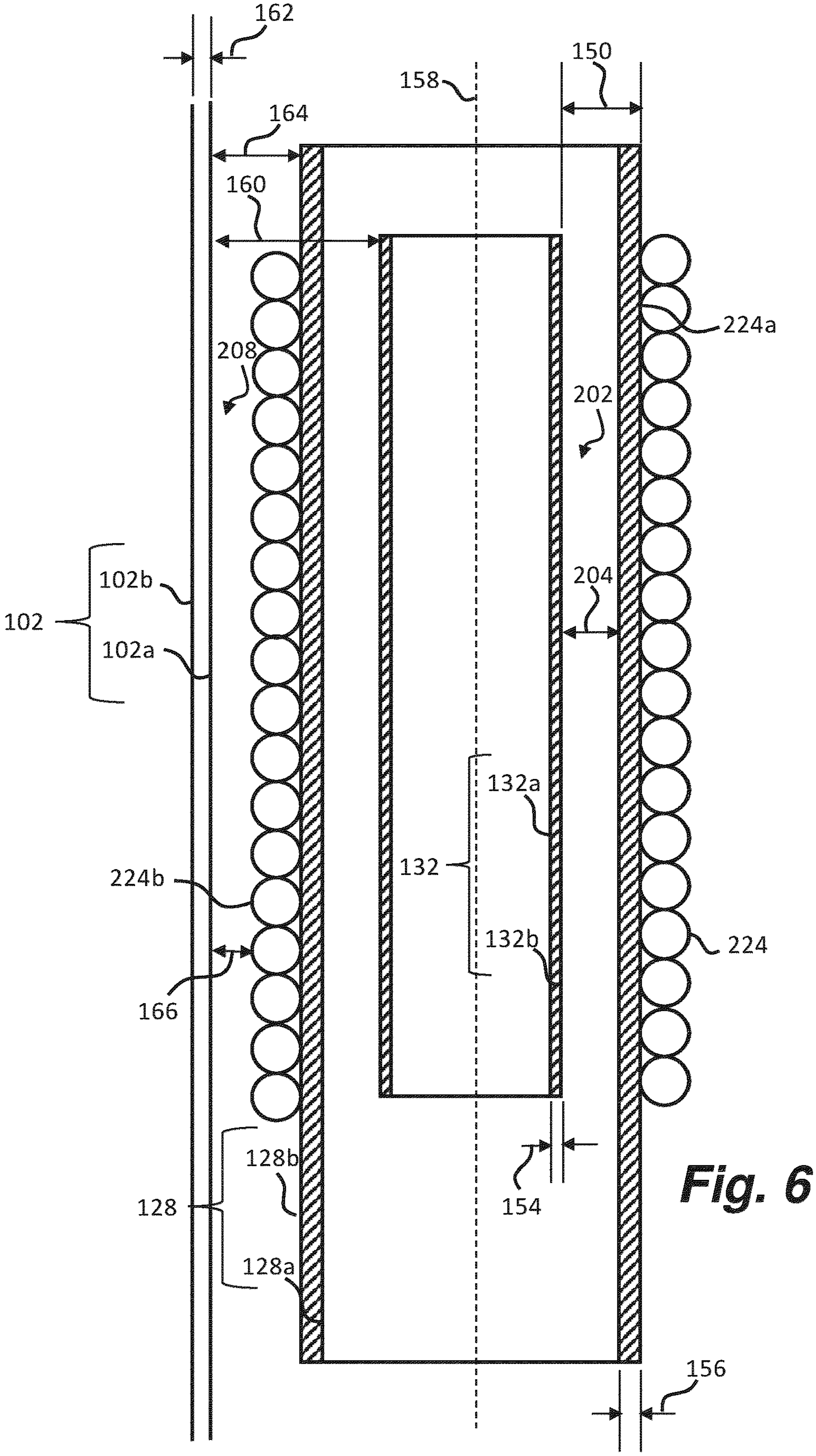
FIG. 6 shows a diagrammatic representation of a susceptor, inductor coil and insulating member arrangement.

FIG. 6 depicts a diagrammatic representation of a cross-section of the susceptor 132 and the insulating member 128 depicted in FIGS. 5A and 5B. However, in this example, the two inductor coils have been replaced with a single inductor coil 224 for clarity. The inductor coil 224 may be replaced by two or more inductor coils.

The inductor coil 224 is wound around the insulating member 128 and is in contact with the outer surface 128*b* of the insulating member 128. In another example, they may not be in contact. The inner surface 224*a* of the inductor coil is therefore positioned away from the outer surface 132*b* of the susceptor 132 by a distance 150. In this example the wire forming the inductor coil 224 has a circular cross section, although other shaped cross sections may be used. The dimensions indicated in FIG. 6 are not shown to scale.

FIG. 6 more clearly depicts the thickness 154 of the susceptor 132 as being the distance between the inner surface 132*a* and the outer surface 132*b* of the susceptor 132, and the thickness 156 of the insulating member 128 as being the distance between the inner surface 128*a* and the outer surface 128*b* of the insulating member 128.

FIG. 6 also depicts the air gap 202 having a width 204. The width 204 of the air gap 202 is the distance between the outer surface 132*b* of the susceptor 132 and the inner surface of the insulating member 128*a*.

FIG. 6 also depicts a cross-section of a portion of the outer cover 102. The outer cover 102 may continue to extend further above and below the insulating member 128. The outer cover 102 provides protection to the internal components of the device, and is generally in contact with a user's hand when the device is in use. The portion of the outer cover 102 depicted is the portion which is arranged closest to the susceptor 132.

The outer cover 102 comprises an inner surface 102*a* and an outer surface 102*b*. The inner surface 102*a* is arranged further away from the susceptor 132 than the outer surface 102*b*. To ensure that the device 100 is not too hot to touch, an air gap 208 may be provided between the inner surface 102*a* of the outer cover 102 and the outer surface 128*b* of the insulating member 128. In this example, the inner surface 128*a* of the outer cover 102 is positioned away from an outer surface 132*b* of the susceptor 132 by a distance 160 of between about 4 mm and about 10 mm. In this particular example, the distance 160 is about 5.3 mm.

The outer cover 102 has a thickness 162 of between about 0.75 mm and about 2 mm. In the present example, the outer cover 102 has a thickness 162 of about 1 mm and is made from 6063 aluminum. The thickness 162 is the distance between the outer surface 102*b* and the inner surface 102*a*, measured in a direction that is perpendicular to the axis 158.

The inner surface 102*a* of the outer cover 102 is positioned away from the outer surface 128*b* of the insulating member 128 by a distance 164 of between about 2 mm and about 3 mm. In this example, the inner surface 102*a* of the outer cover 102 is positioned away from the outer surface 128*b* of the insulating member 128 by a distance 164 of about 2.3 mm.

The inner surface 102*a* of the outer cover 102 may be positioned away from an outer surface 224*b* of the inductor coil 224 by a distance 166 of between about 0.2 mm and about lmm. In the present example, the inductor coil comprises litz wire, having a circular shaped cross section. In such an example, the distance 166 is between about 0.2 mm and about 0.5 mm, such as about 0.25 mm. In examples where the cross section is rectangular shaped (as in the example of FIGS. 5A and 5B), this distance may be greater, for example it may be between about 0.5 mm and about 1 mm, such as about 0.9 mm.

Figure 7:
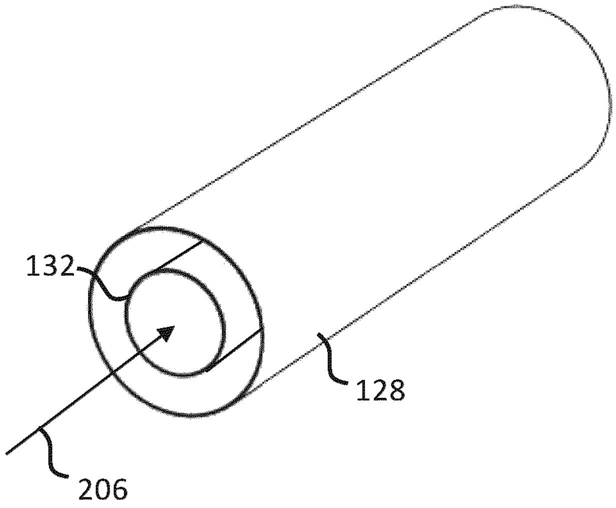
FIG. 7 shows a perspective view of a susceptor surrounded by an insulating member.

FIG. 7 depicts a perspective view the tubular susceptor 132 arranged within, and surrounded by, the insulating member 128. Although both the susceptor 132 and insulating member 128 have a circular shaped cross section, their cross sections may have any other shape, and in some examples may be different to each other. A user can introduce an article 110 into the susceptor 132 by inserting the article 110 in the direction of the arrow 206.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An aerosol provision device, comprising:

a receptacle configured to receive an aerosol generating material, wherein the receptacle comprises a susceptor which is heatable by penetration with a varying magnetic field;

an insulating member extending around the susceptor, wherein the insulating member is positioned away from the receptacle to provide an air gap around the susceptor; and an inductor coil extending around the insulating member such that the insulating member is positioned between the inductor coil and the susceptor, wherein the inductor coil is configured to generate the varying magnetic field.

2. The aerosol provision device according to claim 1, wherein the susceptor is hollow, the insulating member is hollow and the inductor coil is substantially helical.

3. The aerosol provision device according to claim 2, wherein the susceptor is substantially tubular and the insulating member is substantially tubular.

4. The aerosol provision device according to claim 1, wherein the inductor coil is positioned away from an outer surface of the susceptor by a distance of between about 3 mm and about 4 mm.

5. The aerosol provision device according to claim 4, wherein the inductor coil is positioned away from the outer surface of the susceptor by a distance of less than about 3.5 mm.

6. The aerosol provision device according to claim 1, wherein the inductor coil is positioned away from the outer surface of the susceptor by a distance of greater than about 2.5 mm.

7. The aerosol provision device according to claim 1, wherein:

the inductor coil is positioned away from an outer surface of the susceptor by a distance of between about 3 mm and about 4 mm;

the insulating member has a thickness of between about 0.25 mm and about 1 mm; and the susceptor has a thickness of between about 0.025 mm and about 0.5 mm.

8. The aerosol provision device according to claim 1, wherein the inductor coil, the susceptor and the insulating member are coaxial.

9. The aerosol provision device according to claim 1, wherein an inner surface of the inductor coil is in contact with an outer surface of the insulating member.

10. An aerosol provision system comprising:

the aerosol provision device according to claim 1; and an article comprising aerosol generating material, wherein the article is dimensioned to be at least partially received within the receptacle.

11. An aerosol provision device, comprising:

a susceptor configured to receive aerosol generating material, wherein the susceptor is heatable by penetration with a varying magnetic field;

an insulating member extending around the susceptor, wherein the insulating member is positioned away from the susceptor;

an inductor coil extending around the insulating member such that the insulating member is positioned between the inductor coil and the susceptor, wherein the inductor coil is configured to generate the varying magnetic field; and an outer cover forming at least a portion of an outer surface of the aerosol provision device, wherein an inner surface of the outer cover is positioned away from an outer surface of the susceptor by a distance of between about 4 mm and about 10 mm.

12. The aerosol provision device according to claim 11, wherein the inner surface of the outer cover is positioned away from the outer surface of the susceptor by a distance of between about 5 mm and about 6 mm.

13. The aerosol provision device according to claim 11, wherein the insulating member has a thickness of between about 0.25 mm and about 1 mm.

14. The aerosol provision device according to claim 11, wherein the inner surface of the outer cover is positioned away from the outer surface of the insulating member by a distance of between about 2 mm and about 3 mm.

15. The aerosol provision device according to claim 11, wherein the inner surface of the outer cover is positioned away from an outer surface of the inductor coil by a distance of between about 0.2 mm and about 1 mm.

16. The aerosol provision device according to claim 11, wherein an inner surface of the inductor coil is positioned away from the outer surface of the susceptor by a distance of between about 3 mm and about 4 mm.

17. The aerosol provision device according to claim 11, wherein the outer cover has a thickness of between about 0.75 mm and about 2 mm.

18. The aerosol provision device according to claim 11, wherein the insulating member has a thermal conductivity of less than about 0.5 W/mK.

19. An aerosol provision system comprising:

the aerosol provision device according to claim 11; and an article comprising aerosol generating material, wherein the article is dimensioned to be at least partially received, in use, within a susceptor of the aerosol provision device.

20. An aerosol provision system comprising:

the aerosol provision device according to claim 11; and an article comprising aerosol generating material, wherein the article is dimensioned to be in contact with a susceptor of the aerosol provision device.

* * * * *